United States Patent [19]
Lykens

[11] Patent Number: 6,062,698
[45] Date of Patent: May 16, 2000

[54] SYSTEM FOR CREATING VIDEO GENERATED DECORATIVE IMAGES

[76] Inventor: Thomas B. Lykens, 204 Winnebago Dr., Lake Winnebago, Mo. 64034

[21] Appl. No.: 08/229,619

[22] Filed: Apr. 19, 1994

Related U.S. Application Data

[63] Continuation-in-part of application No. 08/005,327, Jan. 15, 1993, abandoned.

[51] Int. Cl.[7] ........................................ G02B 5/08
[52] U.S. Cl. ............................ 359/850; 359/616
[58] Field of Search ................... 359/616, 617, 359/856, 850; 353/1, 2, 787; 348/42, 44, 51

[56] References Cited

U.S. PATENT DOCUMENTS

| | | | |
|---|---|---|---|
| 1,034,478 | 8/1912 | McComb | 359/616 |
| 1,090,278 | 3/1914 | Coates | 359/616 |
| 2,404,943 | 7/1946 | Beshgetoor | 348/787 |
| 2,493,238 | 1/1950 | Eddy | 359/616 |
| 2,900,867 | 8/1959 | Beatman | 359/616 |
| 3,357,768 | 12/1967 | Cox et al. | 359/616 |
| 3,501,217 | 3/1970 | Bottani | 359/616 |
| 3,567,306 | 3/1971 | Spear | 359/616 |
| 3,603,663 | 9/1971 | Lewis | 359/616 |
| 4,202,604 | 5/1980 | Kent et al. | 359/839 |
| 4,475,126 | 10/1984 | Akins | 359/616 |
| 4,815,801 | 3/1989 | Anderson | 359/616 |
| 4,948,241 | 8/1990 | Setteducati | 359/616 |
| 4,952,004 | 8/1990 | Baird et al. | 359/616 |
| 4,978,217 | 12/1990 | Tam | 348/787 |
| 5,117,307 | 5/1992 | Bostock | 359/617 |
| 5,313,276 | 5/1994 | Taaffe | 348/51 |

*Primary Examiner*—A. Zarabian
*Attorney, Agent, or Firm*—Hovey, Williams, Timmons & Collins

[57] ABSTRACT

A system for creating video generated decorative images is provided which includes a projecting device for generating an image and first and second reflecting members including reflective surfaces oriented at an angle of 90° or less to the display surface of the projecting device and of less than 180° to one another. A pleasing and changing kaleidoscopic image is visible when facing the display surface or screen and the first and second reflecting surfaces by the mutual reflection of the images on the screen and the reflecting members. In one preferred embodiment, the junction forming the apex between the reflecting members is inclined to present the appearance of a pentagonal kaleidoscopic image. In another preferred embodiment, one-way mirrors are used to generate further reflections visible from outside the system. The projecting device is preferably a computer monitor which displays randomly generated patterns to produce a dynamic, self-illuminating kaleidoscopic effect.

20 Claims, 4 Drawing Sheets

SYSTEM FOR CREATING VIDEO GENERATED DECORATIVE IMAGES

This application is a continuation-in-part of application Ser. No. 08/005,327, filed Jan. 15, 1993, abandoned Apr. 19, 1994.

BACKGROUND OF THE INVENTION

1. Field of the Invention

This invention concerns a device for generating a dynamic kaleidoscopic display of even or odd numbered visual multiples using images generated by a video screen and reflected from at least a pair of reflecting surfaces. The system hereof creates symmetrical images which, when used with a computer driven video monitor operating in a continuous image generation mode, creates a dynamic visual experience.

2. Description of the Prior Art

Kaleidoscopes are well known novelty items commonly including a tube having one translucent end, an array of mirrors, and colored fluid or particulate matter which, when rotated, gives the illusion of a symmetrical image. The traditional kaleidoscope is inexpensive but extremely limited in the nature and quality of the image to be displayed, such that modern-day users quickly become bored and lose interest.

More recently, different devices have been employed which use mirrors to create and display symmetrical images. For example, U.S. Pat. No. 3,567,306, two upright mirrors are positioned over a rotating turntable to provide a kaleidoscopic image. U.S. Pat. No. 3,603,663 involves a similar device wherein the turntable is provided within a cover such that an opening is provided between the mirrors. U.S. Pat. No. 4,952,004 discloses a similar device including a means of illuminating the turntable from beneath to provide brighter, clearer images.

While these devices present an improvement over traditional kaleidoscopes, the visual effects are confined to the plane of the display surface and limited in the images which may be presented by virtue of the necessity of providing a disc or the like with a fixed image pattern to rotate beneath the mirrors. In addition, they are further limited to an even number of kaleidoscopic multiples as a consequence of an asymmetric primary image.

A video screen is shown as part of a visual image display apparatus in U.S. Pat. No. 4,475,126.

The availability of computer generated graphics provides a medium for greatly advancing the level of kaleidoscopic imagery.

SUMMARY OF THE INVENTION

The goals of image diversity and enhanced imagery are generally achieved in accordance with the present invention which includes a means of projecting an image with mirrors oriented at angles of 90° or less to the display surface or screen, thereby providing a unique kaleidoscopic system. When the projection means is a computer monitor projecting a dynamic graphic display program produced by a random combination of drawing algorithms, the symmetrical kaleidoscopic illusion visible to the user is quite unique.

The system hereof has an array of mirrors including at least two reflecting members oriented at an angle of 90° or less to the display surface, and less than 180° to one another. A mask preferably limits the portion of the screen to provide an opening defining the image to be reflected. The shape of the opening determines the formal limits of the image to be displayed. The resulting illusion is a combination of the image from the display surface as shaped by the mask opening, and the reflections from the respective reflecting members.

In one preferred embodiment of the invention, the reflecting members are oriented substantially perpendicular to the display surface, which is preferably flat. The reflecting members, which may be metal, coated glass, or polymeric material provided with a reflective coating, are oriented at an acute angle. When an angle of 60° is used, a hexagonal image is provided for a viewer looking along a line substantially bisecting the angle between the reflecting members and slightly above the plane of the display surface. When an angle of 72° is used in conjunction with an axially symmetrical computer display, a visually complete pentagonal kaleidoscope is formed.

In an alternate preferred embodiment, the reflecting members are oriented not only at an acute angle to one another but also an acute angle relative to the display surface. The effect is that of a triangular pyramid with the front panel open, and as a result of the inclined axis, the kaleidoscopic image is reflected up and around the axis, no longer confined to the plane of the display surface.

In a further preferred embodiment, the mirror array is enclosed by a one-way mirror forming a front panel member. When the other reflecting members are also one-way mirrors, the internal reflections are multiplied within the area enclosed by the reflecting members and are visible through all sides of the structure.

The effect of the present invention is especially enhanced when the mask is in use and the system is used in a darkened room. The symmetrical image revealed to the user are both colorful and distinct when an enhanced color monitor is used. When the monitor is displaying continuously changing images generated by a computer program operating in an automatic mode, a single image may not repeat itself for many hundreds of hours.

Many other advantages and improvements over the prior art may be appreciated by reference to the drawings and the written specification hereof.

DESCRIPTION OF THE PREFERRED EMBODIMENTS

Figure 1:
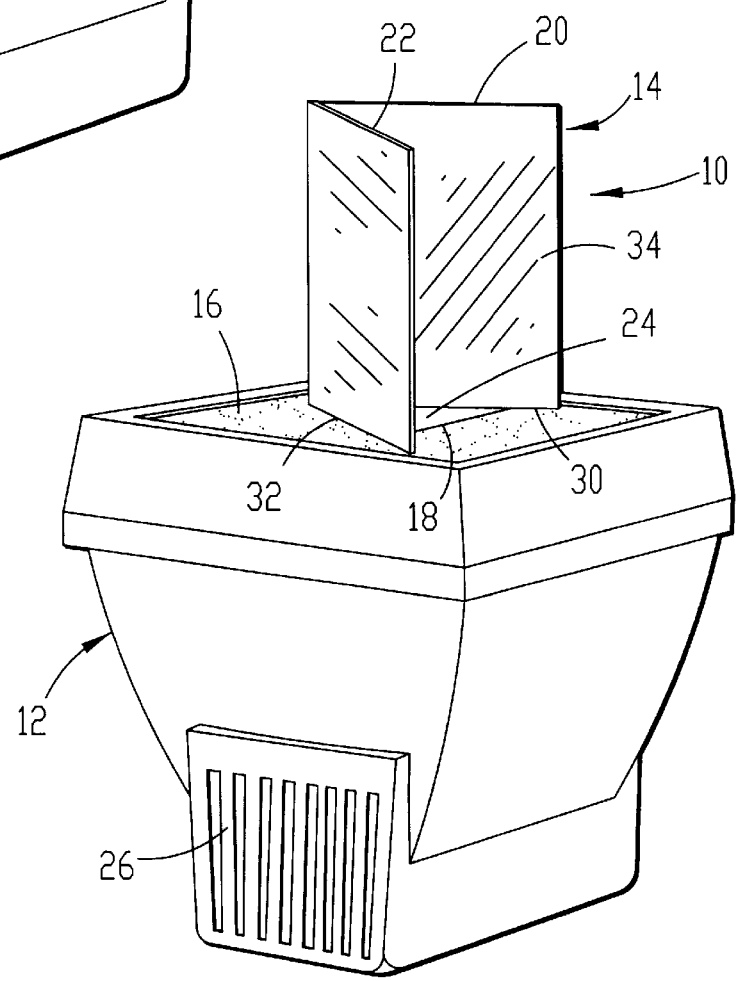
FIG. 1 is a perspective view of a first embodiment of the present invention showing a video monitor, mask and mirror array oriented substantially normal to the screen of the monitor.
Figure 5:
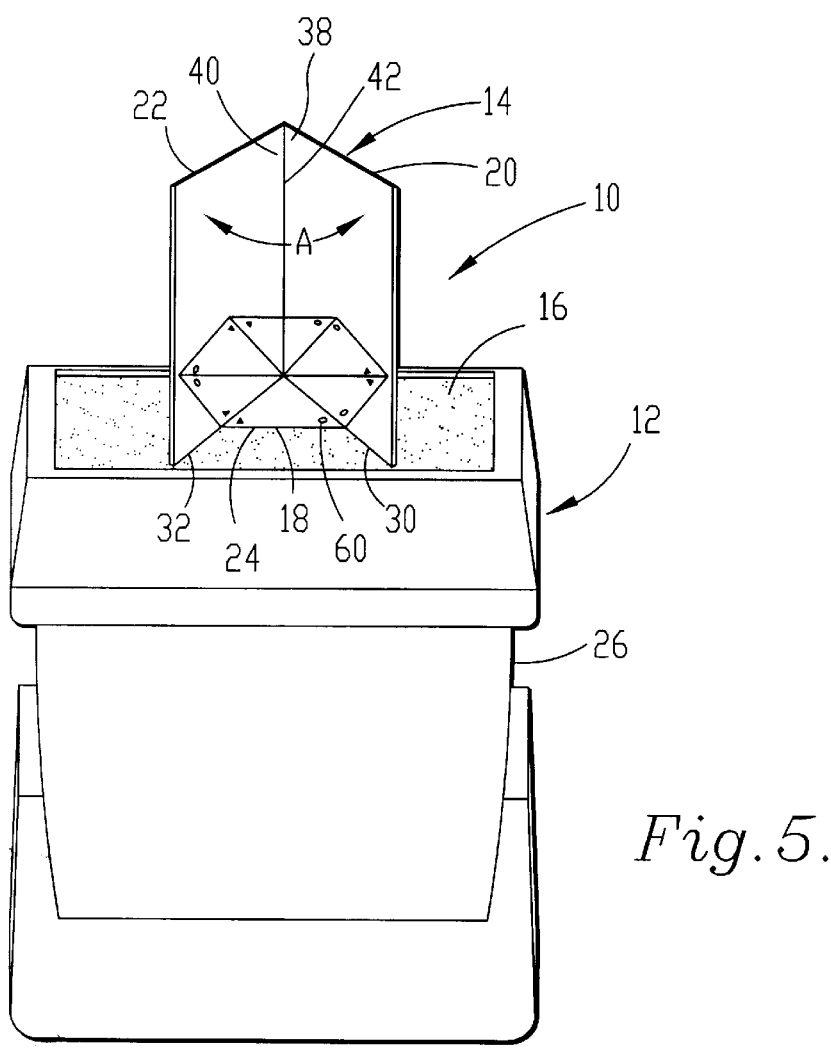
FIG. 5 is a perspective view of the first embodiment of the present invention showing a pattern image generated by the video monitor as a part of the kaleidoscopic image as it appears to the viewer.

Referring now to FIGS. 1 and 5, a viewing apparatus 10 in accordance with the present invention broadly includes projection means 12, a mirror array 14, and a mask 16 presenting an optical opening 18 therein. The mirror array 14 is positioned with at least a first reflecting member 20 and a second reflecting member 22 positioned generally upright from a display surface 24 of the projection means and with the optical opening 18 angularly intermediate the first and second reflecting members 20, 22 for reflecting a primary image appearing on the display surface 24 and for producing reflected images.

In greater detail, the projection means 12 for each of the embodiments shown in the drawings could be a television set, which would be acceptable for generation of asymmetric primary images. Preferably, the projection means is a computer monitor 26 which is capable of generating not only asymmetric displays, but symmetrical dynamic displays as well. Computer generated, axially symmetrical primary images make possible kaleidoscopic effects of odd numbered multiples instead of the familiar 4, 6 or 8 segmented kaleidoscopic images. Triaxial symmetry is required for perfect three dimensional reflective closure in the system illustrated in FIG. 4. While other projection means such as Liquid Crystal Displays, LCD video projection panels such as the QA-1150 by Sharp Electronics and backlit screens may be used, a cathode ray tube monitor provides enhanced brightness, contrast and definition. The computer monitor 26 is preferably of the high-resolution color variety known in the trade as SVGA, and in particular the monitor manufactured by Zenith Electronics of Glenview, Illinois and sold by Zenith Data Systems (model ZCM-1495) and Compaq Computer Corporation of Houston, Tex., (model QVision 150 and 170). These particular monitors each have a flat screen which serves as a display surface 24. Having a flat screen as a display surface 24 is advantageous in the present invention as it allows the use of first and second reflecting members which have respective linear bottom margins 30 and 32. In conventional video screens having curved surfaces, either the bottom margins 30 and 32 respectively of the first and second reflecting members must be trimmed to conform to the curved surface or a gap is presented between the reflecting members and the display surface which detracts from the illusion of the kaleidoscopic image.

The mask 16 may be of any opaque material. Its purpose is to block out all of the image projected onto the display surface 24 except that within the desired opening 18. This blocks out all the extraneous light except the image 28 in order to yield the desired effect. Examples of suitable material include paper, opaque synthetic resin, metal and wood. Mask 16 would be unnecessary if the display screen were already in the shape of a desirable kaleidoscopic segment.

Figure 6:
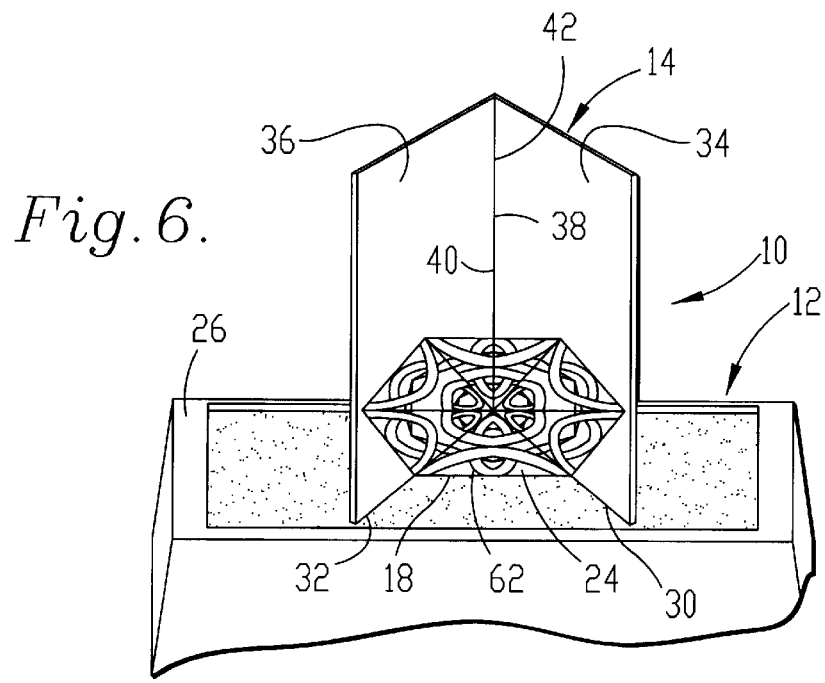
FIG. 6 is a perspective view similar to FIG. 5 showing a decorative image generated by the monitor and symmetrically reflected by the array.

The mirror array 14 includes a first reflective member 20 having a reflective surface 34 oriented to reflect the image 28 received through the opening 18 toward both the second reflective member 22 and the viewer, who is preferably positioned along a line roughly bisecting the angle A between the first reflective member 20 and the second reflective member 22. The second reflective member is similarly provided with a reflective surface 36 oriented to reflect light toward the first reflective member 20 and the viewer. Reflective members 20 and 22 as shown in FIGS. 1, 5 and 6 are glass mirrors provided with a silvered coating on the front surface, but may be coated in the back, or be of acrylic polymer with a reflective coating, or be manufactured of polished metal or other material to provide a reflective coating. The portions of the mirror array 14 are held in a desired shape by adhesive tape, adhesive bonding material or a suitable framework. The use of the flat display surface 24 makes the use of mirrored glass easier, and when the display surface is curved, acrylic polymer, such as "plexiglas" which has a reflective surface can be reconfigured to have a bottom margin which follows the curvature of the display surface screen.

The mirror array 14 in FIGS. 1, 5 and 6 is positioned upright relative to the display surface 24 and extends substantially perpendicular thereto with the respective inner margins 38 and 40 joined and juxtaposed to provide an axis 42 extending substantially normal to the display surface. In order to achieve the desired kaleidoscopic effect, the reflective members 20 and 22 should not be divergent, that is to say, should have an angle less than 180° between the respective reflective surface 34 and 36. The angle A at axis 42 between the reflective members of the mirror array 14 is shown as 60°, which provides a hexagonal kaleidoscopic image as shown in FIGS. 5 and 6. This angle could be smaller or greater than 60°, but in any event the angle between adjacent reflective members should be less than 180° to provide mutual reflection, and preferably should be an angle divisible into 360° without a remainder. An angle that is divisible into 360 an odd number of times will still result in kaleidoscopic closure if the primary image is axially symmetrical and will produce a composite image with an odd number of image segments made up of the primary image and reflected images. The smaller the angle A between reflective members 20 and 22, the narrower the field of view.

As may be seen from the drawing, the reflective members 20 and 22 are positioned adjacent to the display surface 24 to avoid the appearance of "bars" or wide break lines in the reflected image. Members 20, 22 present respective interior base angles relative to display surface 24. The kaleidoscopic image or illusion appears by a combination of the image passing through the opening 18 and the images visible on the mirror array 14. The greater the size of the opening 18, the greater need be the width of the respective reflective members 20 and 22 to provide a greater horizontal field of view. In addition, increasing the height of the reflective members 20 and 22 increases the vertical field of view.

Figure 3:
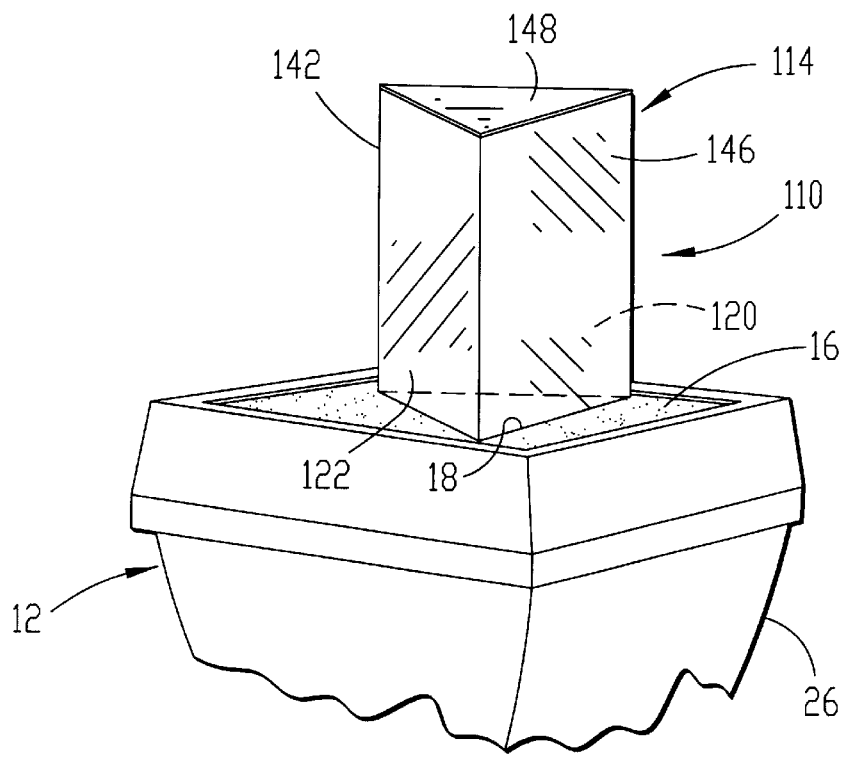
FIG. 3 is a fragmentary perspective view similar to FIG. 1 of a third embodiment wherein a one-way mirror is provided at the front of the mirror array to enclose the area above the mask opening.

In an alternate embodiment shown in FIG. 3, the system 110 includes the same projection means 12, but the mirrored array 114 is modified to include, as well as reflective members 120 and 122 joined along axis 142, a reflective front panel 146 and an optional cover 148, adhesive or the like connecting the component members of the array. The array 114 is preferably positioned over the opening 18 in the mask 16 so that the opening is entirely surrounded by the array. The reflective front panel 146 and reflective members 120 and 122 are preferably planar sheets of "one-way" mirrors composed of glass, or as an alternative, "one-way" acrylic polymer. "One-way", as used herein, refers to a coated glass or polymer which has greater transparency when viewed from one side thereof and greater reflectivity when viewed from the opposite side. Such "one-way" mirrors are commonly used in interrogation rooms to permit observers to see through the glass without being seen. In the present invention, the use of "one-way" glass or polymer as the material of the front panel 146 and members 120 and 122 provides a radically enhanced kaleidoscopic effect as the primary kaleidoscope is then multiplied into a quilt-like pattern of an infinite number of kaleidoscopic panels appearing to recede infinitely into the distance. The illusion is visible from and through all sides of the structure.

In yet another alternate embodiment, the system 210 is formed of a mirrored array 214 positioned over the projection means 12. The mirrored array 214 includes first reflective member 220 and second reflective member 222 which are inclined into acute angles relative to each other and to the display surface 24. The mirrored array 214 is positioned over the opening 18 in the mask 16 so that the image is reflected by the respective reflective mirrored surfaces of the reflective members 220 and 222 toward the viewer. The reflective members 220 and 222 are preferably isosceles triangles, forming a planar angle of 72 degrees with respect to each other. This results in a pentagonal kaleidoscopic illusion which is no longer confined to the primary image plane, but reflects up and around the resulting inclined axis 250 as shown in FIG. 7.

Figure 2:
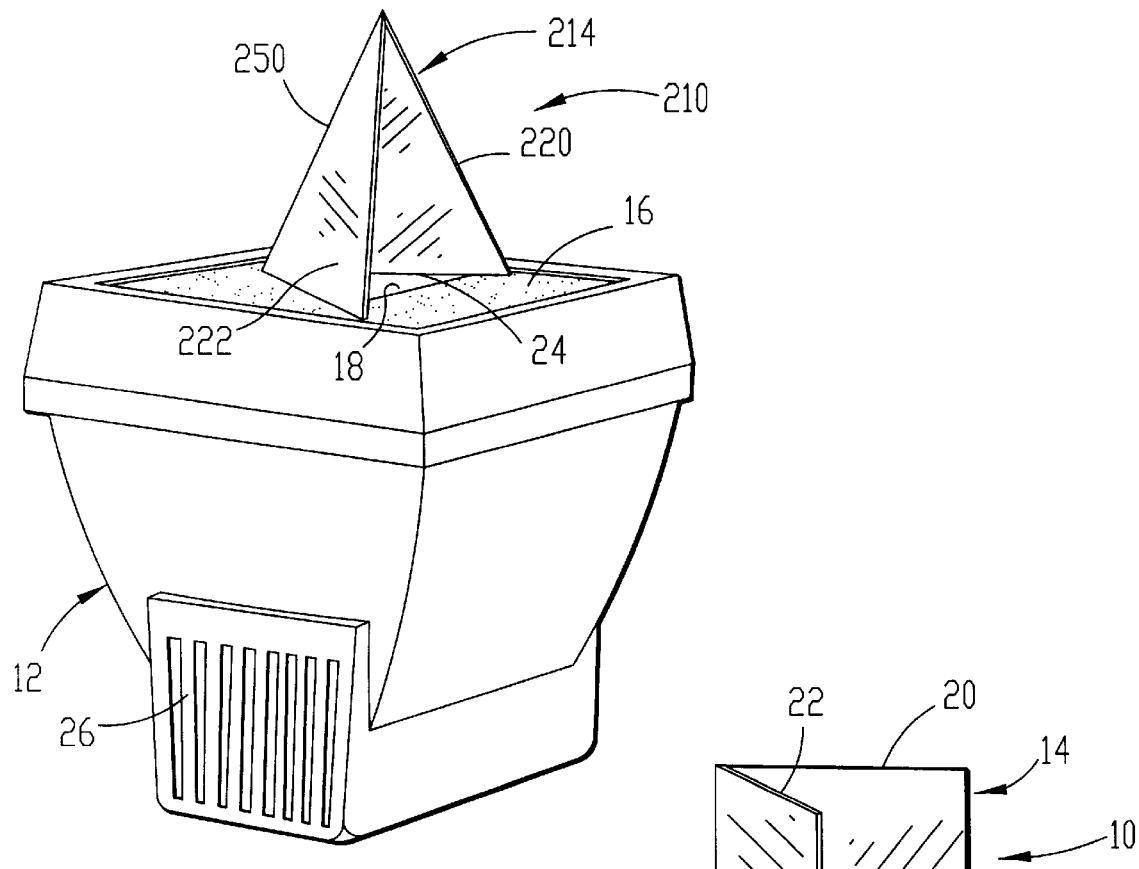
FIG. 2 is a perspective view similar to FIG. 1 showing a second embodiment of the present invention wherein the mirror array is modified to present reflective surfaces inclined relative to the screen.
Figure 4:
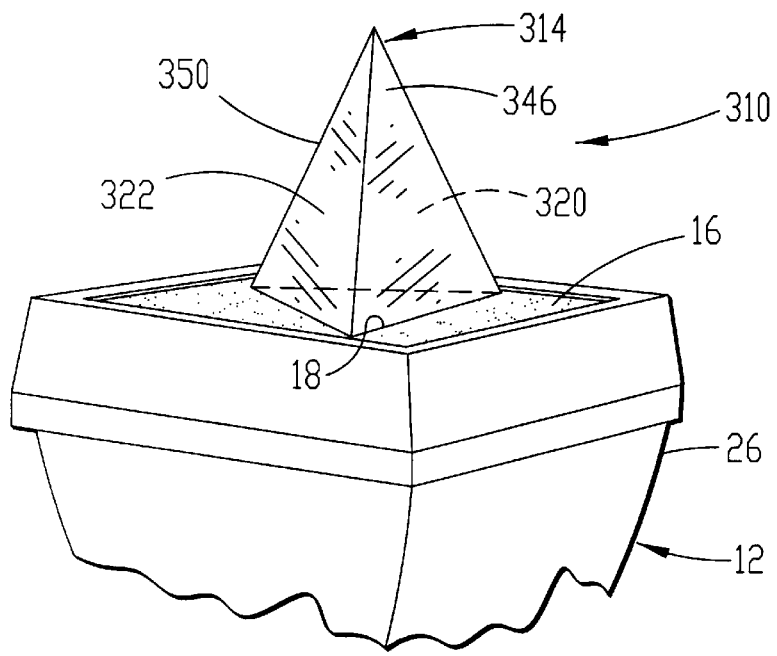
FIG. 4 is a fragmentary perspective view similar to FIG. 2 showing a fourth embodiment of the present invention wherein a one-way mirror front panel has been added to enclose the area above the mask opening forming a triangular pyramid.

A fourth embodiment is the system 310 shown in FIG. 4 which builds upon system 210 of FIG. 2. It includes a front panel 346 comprising a third reflective member which is provided of a "one-way" mirror material. The mirror array 314 effectively presents a triangular pyramid which encloses the volume immediately above the opening 18 and, in combination with the display surface 24 of the projection means 12, a triangular pyramid is effectively created. The axis 350 between reflective members 320 and 322 is 72° as are the axes between front panel 346 and the reflective members 320 and 322. The planar angle of 72° between reflective members 320, 322, and 346 is critical. When the angles are 72°, the four apexes of the array each reflect an inverted pentagonal pyramid each of which appears to be adjacent to those identical illusions created by the other apexes. When viewed through the side of one-way mirror, the resultant illusion is that visible part of the interior of a 20 sided regular polyhedron, and icosahedron, comprised of four apexes reflecting pentagonal kaleidoscopic illusions of the triaxially symmetric primary image. The 20 sides are comprised of one side being the primary image and the other 19 are kaleidoscopic reflections. From within the mirrored array, the illusion would appear to the viewer as the kaleidoscopic interior of a 20 sided regular polygon. The fourth embodiment of the system 310 thus requires at least the one front panel 346 be of the aforementioned "one-way" mirror material, but preferably reflective members 320 and 322 are also of such "one-way" mirror. The resulting illusion is that part of a kaleidoscopic icosahedron visible through any side of the internally reflective triangular pyramid.

Figure 9:
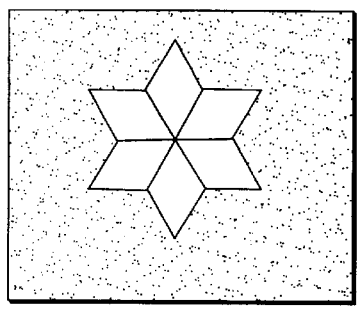
FIG. 9 is a representative view of the illusion created by the embodiment of FIG. 8.
Figure 8:
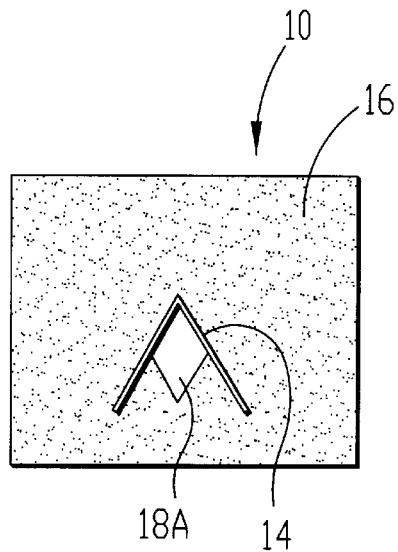
FIG. 8 is a top plan view of the embodiment of FIG. 1, showing the mirror array with an alternate mask and opening therein.
Figure 7:
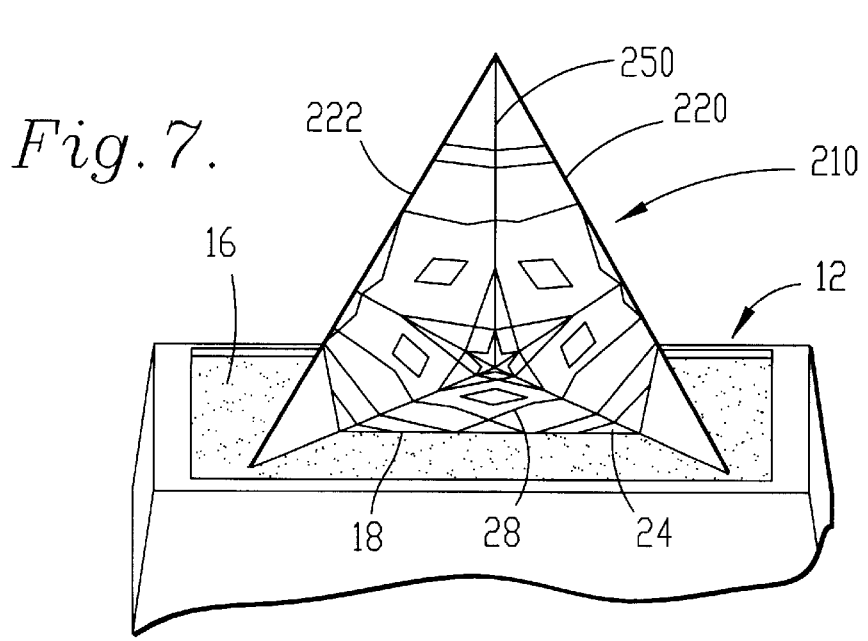
FIG. 7 is a perspective view taken along the normal line of viewing in the embodiment of FIG. 2 and showing the kaleidoscopic image therein.

The visual effect of the kaleidoscopic image created by the systems are represented by FIGS. 5, 6, and 7. FIG. 5 illustrates the reflection created by a simple pattern image 60 showing how corresponding triangles and circles are reflected. FIG. 6 illustrates a more advanced pattern image 62 resulting in the kaleidoscopic image in the same hexagonal presentation. The reflected kaleidoscopic image presents the illusion of a total of six wedge shaped images. FIG. 8 illustrates the actual appearance of the mask 16, (in plan view) with an alternative opening 18A and mirror array 14 over the projection means 12, wherein the opening 18A is diamond-shaped. FIG. 9 illustrates the effective illusion created by the system 10—that there is indeed an opening 18A (and thus an image) which is in 6 separate sections forming the image of a star. FIG. 7 illustrates the pentagonal kaleidoscopic image generated by the use of the system 210 when an image 28A is projected on the display surface 24, which is quite different than the resulting kaleidoscopic image if the mirror array 14 of the system 10 were in use, though the opening 18 remains of the same size.

The images 28, 60 and 62 are generated by a computer. An effective computer for generating a desired image on the display surface 24 is any IBM-PC compatible personal computer using an Intel 80386SX central processing unit. While other computers would undoubtedly generate a desirable image, I have found that images generated by the program Dazzle 4.1 by J. R. Shiflett and sold by Microtronics of Spring, Tex. produces excellent graphics. This axially symmetrical program can be operated in an automatic generating mode which, once initiated, requires no further attention by the operator-viewer. An image is generated by the program and displayed on the screen of the monitor whereupon the image shown will alter, scroll, and change color. A continuous procession of altering combinations of drawing algorithms create a constantly changing, intricate dynamic pattern projected on the viewing screen.

Although normal television imagery or animation is visually asymmetric, it would prove sufficient for some uses in systems 10, 110, and 210 when the kaleidoscopic effect is completely dependent upon axis angles creating an illusion of an even number of segments, including the generated image segment. The desired symmetry is achieved independently of the asymmetric projected or generated image. However, in systems 10 and 210 it is possible to create kaleidoscopic illusions of odd numbered segments by using a computer to generate symmetrical primary images and by changing the adjacent reflective angles so that these angles are divisible into 360 an odd number of times. This computer generated symmetry is required because the illusion now is that of an even number of reflected segments plus the one primary image segment resulting in the odd number of kaleidoscopic panels. When the odd number is then multiplied by 2 (the axial symmetry factor) the system then achieves visual kaleidoscopic closure not possible with prior art. A similar consideration is required by system 310. In order for this system to achieve mirror image integrity along every edge of the reflected icosahedron, the equilateral triangle of the primary image must be axially symmetrical about each of the three medians of the triangle.

Although preferred forms of the invention have been described above, it is to be recognized that such disclosure is by way of illustration only, and should not be utilized in a limiting sense in interpreting the scope of the present invention. For example, a semi-transparent or translucent multi-faceted diffuser screen such as is used with fluorescent lighting can be placed over the display surface when an ordinary television is used. This not only provides a flat supporting surface for the mirror array but also provides abstract visual images. This not only provides a flat supporting surface for the mirror array but also provides abstract visual images. For creating large scale environmental kaleidoscopes, a computer could be used with a Sony Jumbotron or Mitsubishi Diamond-Vision, the large television-like screens seen in major sports stadiums and arenas. Using a primary image screen of that monumental size and constructions of "one-way" mirror would make monumental sized electronic kaleidoscopes possible, kaleidoscopes large enough that they could be experienced from within as well as viewed externally.

Obvious modifications to the exemplary embodiments, as hereinabove set forth, could be readily made by those skilled in the art without departing from the spirit of the present invention. For example, the spacing between the mirrors and the screen could be varied to create different effects.

The inventor hereby states his intent to rely on the Doctrine of Equivalents to determine and assess the reasonable fair scope of his invention as pertains to any apparatus not materially departing from but outside the liberal scope of the invention as set out in the following claims.

I claim:

1. A viewing apparatus for creating images comprising:

display means for producing an electronically generated—primary image on a display surface in response to image signals;

means coupled with said display means for providing image signals thereto; and an array of mirrors positioned adjacent said display surface and adjacent one another for reflecting said primary image from said display surface and for reflecting images from one another to produce reflected images in order to create a segmented, kaleidoscopic composite image having image segments including said reflected images, each of said mirrors presenting the shape of a triangle having a base adjacent said display surface and two, equal-length edges, adjacent ones of said mirrors presenting an image axis at the juncture thereof, said image axis presenting an angle of less than 90° relative to said display surface, each of said mirrors presenting an interior base angle of less than 90° relative to said display surface.

2. The apparatus as set forth in claim 1, said means for providing image signals including means for producing said signals so that said primary image presents axial symmetry, adjacent ones of said mirrors presenting an axis angle therebetween, said axis angle being divisible into 360 an odd number of times for thereby producing said composite image with an odd number of said segments.

3. The apparatus as set forth in claim 1, said array including at least three of said mirrors positioned to present an enclosed space with each of said mirrors having an interior reflective surface and with at least one of said mirrors being a one-way mirror for creating a pattern of a plurality of said composite images adjacent one another.

4. The apparatus as set forth in claim 3, a plurality of said mirrors being one-way mirrors for allowing viewing of said pattern from a corresponding plurality of locations exterior to said array.

5. The apparatus as set forth in claim 3, said one-way mirror being composed of glass.

6. The apparatus as set forth in claim 3, said one-way mirror being composed of acrylic.

7. The apparatus as set forth in claim 1, said means for providing image signals including means for providing said signals for producing a continuously changing sequence of primary images on said display surface.

8. The apparatus as set forth in claim 2, said array including two only of said mirrors.

9. The apparatus as set forth in claim 1, said array including three only of said mirrors.

10. The apparatus as set forth in claim 9, each of said mirrors presenting a rectangular configuration, said base angles being about 90°, each of said mirrors presenting opposed side edges abutting adjacent side edges of the others of said mirrors, at least one of said mirrors being a one-way mirror for creating a pattern of a plurality of said composite images adjacent one another in a quilt-like pattern appearing to recede infinitely into the distance when viewed exteriorly of said array through said one-way mirror.

11. The apparatus as set forth in claim 10, each of said mirrors being a one-way mirror, said one-way mirrors enabling a viewer to view said quilt-like pattern through any side of said array.

12. The apparatus as set forth in claim 10, none of said mirrors being a one-way mirror, said mirrors requiring viewers to view said quilt-like pattern from within said apparatus.

13. The apparatus as set forth in claim 9, each of said mirrors presenting the configuration of an isosceles triangle, said base angles being less than about 90°, each of said mirrors presenting opposed side edges abutting adjacent side edges of the others of said mirrors for forming the configuration of three sided pyramid, said sides at 72° planar angles to each other, at least one of said mirrors being a one-way mirror for creating a pattern of a plurality of said composite images adjacent one another in a pattern appearing to be that of the interior of a regular icosahedron when viewed exteriorly of said array through said one-way mirror.

14. The apparatus as set forth in claim 13, none of said mirrors being a one-way mirror said mirrors requiring viewers to view said icosahedronal pattern from within said apparatus.

15. The apparatus as set forth in claim 1, said display surface being positioned generally horizontally with said mirrors being generally upright relative to said display surface.

16. The apparatus as set forth in claim 1, further including masking means for masking a portion of said display surface and for defining an optical opening intermediate of said mirrors.

17. The apparatus as set forth in claim 1, further including masking means for masking a portion of said display surface and for defining an optical opening angularly coextensive with and interior of said mirrors.

18. A viewing apparatus for creating images comprising:

display means for producing an electronically generated primary image on the display surface in response to image signals;

means coupled with said display means for providing image signals thereto; and an array of mirrors positioned adjacent said display surface and adjacent one another for reflecting said primary image from said display surface and for reflecting images from one another to produce reflected images in order to create a segmented, kaleidoscopic composite image having image segments including said reflected images, adjacent ones of said mirrors presenting an angle therebetween divisible into 360 a whole number of times for producing said composite image, said primary image being symmetrical for producing said composite image as a symmetrical image, adjacent ones of said mirrors presenting an angle therebetween divisible into 360 an odd number of times to form an image with an odd number of image segments.

19. The apparatus as set forth in claim 1, said means for providing image signals including a computer.

20. A viewing apparatus for creating images comprising:

an array of mirrors configured for positioning adjacent a display surface of a display device operable for producing an electronically generated primary image on the display surface in response to image signals received from a source thereof, said mirrors being adjacent one another for reflecting the primary image from the display surface and for reflecting images from one another to produce reflected images in order to create a segmented, kaleidoscopic composite image having image segments including said reflected images, each of said mirrors presenting the shape of a triangle having a base configured for positioning adjacent the display surface and two, equal-length sides, adjacent ones of said mirrors presenting an image axis at the juncture thereof, said image axis presenting an angle of less than 90° relative to the display surface, each of said mirrors presenting an interior base angle of less than 90° relative to the display surface when positioned adjacent thereto.

* * * * *